(12) United States Patent
Reber et al.

(10) Patent No.: US 8,168,898 B2
(45) Date of Patent: May 1, 2012

(54) METHOD OF OPTIMIZING THE BEHAVIOR OF A FORCE-MEASURING DEVICE, AND FORCE-MEASURING DEVICE

(75) Inventors: Daniel Reber, Madetswil (CH); Marc Nussbaumer, Zurich (CH); Martin Rickli, Seuzach (CH)

(73) Assignee: Mettler-Toledo AG, Greifensee (CH)

( * ) Notice: Subject to any disclaimer, the term of this patent is extended or adjusted under 35 U.S.C. 154(b) by 1527 days.

(21) Appl. No.: 11/471,638

(22) Filed: Jun. 21, 2006

(65) Prior Publication Data

US 2007/0007050 A1    Jan. 11, 2007

(30) Foreign Application Priority Data

Jun. 21, 2005   (EP) ..................................... 05105423

(51) Int. Cl.
*G01L 1/00* (2006.01)
*G01G 23/01* (2006.01)

(52) U.S. Cl. .................... 177/25.13; 702/101; 177/50

(58) Field of Classification Search ............... 177/25.13, 177/50; 73/1.13, 1.15; 702/101, 102
See application file for complete search history.

(56) References Cited

U.S. PATENT DOCUMENTS

| | | | | |
|---|---|---|---|---|
| 4,299,130 A | * | 11/1981 | Koneval | 73/766 |
| 4,412,298 A | * | 10/1983 | Feinland et al. | 702/102 |
| 4,691,290 A | | 9/1987 | Griffen | |
| 4,836,308 A | | 6/1989 | Davis et al. | |
| 5,623,128 A | * | 4/1997 | Grimm et al. | 177/25.13 |
| 5,640,334 A | * | 6/1997 | Freeman et al. | 702/101 |
| 5,794,586 A | * | 8/1998 | Oda et al. | 123/305 |

(Continued)

FOREIGN PATENT DOCUMENTS

EP   03/078937 A1   9/2003

(Continued)

OTHER PUBLICATIONS

"Bauen Sie Ihre Qualität Auf Solidem Grund" (Build Your Quality on Solid Ground), company publication, Mettler Toledo GmbH, Jan. 2001, pp. 2-28.

(Continued)

*Primary Examiner* — Randy W Gibson
(74) *Attorney, Agent, or Firm* — Buchanan Ingersoll & Rooney PC (57) ABSTRACT

A method serves to optimize the behavior of an electronic force-measuring device, in particular a balance that comprises a measuring transducer through which a measuring signal is formed which is representative of a load applied to the force-measuring device, which measuring signal is delivered to a signal-processing unit that is supported by at least one processor and at least one memory storage unit and serves to process digital signals. First characteristic traits for the condition of the force-measuring device are determined, the first characteristic traits being the result of internal and/or external factors affecting the force-measuring device, and/or second characteristic traits for the force-measuring device are determined from the analysis of at least one signal profile of the measuring signal, whereupon the condition of the force-measuring device is determined on the basis of the first and/or second characteristic traits, and the further processing of the measuring signal and/or the operation of the force-measuring device is controlled accordingly. Based on the condition of the force-measuring device that was determined, the processing or evaluation of the signal as well as the use of optimizing measures that serve to determine, e.g., optimized correction parameters such as drift parameters or filter parameters can be advantageously controlled.

24 Claims, 8 Drawing Sheets

U.S. PATENT DOCUMENTS

| | | | |
|---|---|---|---|
| 5,832,417 A * | 11/1998 | Petrucelli et al. | 702/101 |
| 5,856,638 A | 1/1999 | Burkhard et al. | |
| 6,080,938 A * | 6/2000 | Lutz | 177/25.15 |
| 6,215,078 B1 * | 4/2001 | Torres et al. | 177/25.15 |
| 6,271,484 B1 | 8/2001 | Tokutsu | |
| 6,479,766 B2 * | 11/2002 | Gray et al. | 177/144 |
| 6,502,048 B1 * | 12/2002 | Lichtinger et al. | 702/101 |
| 6,759,604 B2 * | 7/2004 | Ishida et al. | 177/144 |
| 6,794,586 B1 * | 9/2004 | Mason | 177/25.15 |
| 6,995,323 B2 * | 2/2006 | Kunzi et al. | 177/25.13 |
| 7,363,184 B2 * | 4/2008 | Hibner et al. | 702/101 |
| 7,516,035 B2 * | 4/2009 | Tellenbach et al. | 702/105 |
| 7,652,215 B2 * | 1/2010 | Hamamoto et al. | 177/180 |
| 2004/0088342 A1 | 5/2004 | Aikawa et al. | |
| 2007/0010960 A1 * | 1/2007 | Tellenbach et al. | 702/105 |
| 2008/0110681 A1 * | 5/2008 | Von Arb et al. | 177/25.13 |
| 2009/0100899 A1 * | 4/2009 | Hamamoto et al. | 73/1.13 |
| 2010/0004876 A1 * | 1/2010 | Loher et al. | 702/41 |

FOREIGN PATENT DOCUMENTS

| | | |
|---|---|---|
| WO | 0 945 717 A1 | 9/1999 |

OTHER PUBLICATIONS

"Wägefibel" (Weighing Primer), Mettler Toledo GmbH, Apr. 2001, pp. 1-20.

European Search Report (with English translation) dated Nov. 7, 2005.

"*Praktischer Leitfaden de wägetechnischen Begriffe*", Mettler-Toledo Wägelexikon (Mettler-Toledo Weighing Lexicon), Jun. 1992, pp. 48-50, Mettler-Toledo, Germany.

* cited by examiner

METHOD OF OPTIMIZING THE BEHAVIOR OF A FORCE-MEASURING DEVICE, AND FORCE-MEASURING DEVICE

RELATED APPLICATIONS

The present application claims priority under 35 U.S.C. §119 to European Application No. 05105423.7 filed Jun. 21, 2005, the contents of which are hereby incorporated by reference in their entirety.

BACKGROUND

A method of optimizing the behavior of an electronic force-measuring device is disclosed. A force-measuring device, in particular a balance, is disclosed that is suitable for carrying out the inventive method.

The behavior of an electronic force-measuring device, for example a balance with electromagnetic force compensation (also referred to as magnetic force restoration or MFR balance) or a balance with an elastically deformable element and strain gauges (also referred to as S/G balance), and thus the accuracy of the measurement results delivered by the force-measuring device, is determined by numerous influence factors. Significant among these influence factors are those described in [1], EP 0 945 717 A1, and in [2], "Bauen Sie Ihre Qualitat auf solidem Grund!" (Build your Quality on Solid Ground!), company publication, Mettler Toledo GmbH, January 2001, as well as in [3], "Wagefibel" (Weighing Primer), Mettler Toledo GmbH, April 2001. One can distinguish between internal influence factors, i.e., those that are determined by the properties of the components of the force-measuring device, and external influence factors, i.e., those that are determined by external physical factors as well as by actions of the user. Further of significance is the behavior of the force-measuring device in the presence of the aforenamed internal and external influence factors, which behavior is determined by processes that are implemented in the signal-processing unit of the force-measuring device and controlled by at least one processor.

Properties of the balance that are connected to internal influence factors and play a part in determining the accuracy of a measurement include creep, hysteresis, linearity, eccentric load errors, repeatability, temperature stability, settling time, and resolution.

As discussed in reference [3], the external influence factors that determine the accuracy of a balance are determined by physical factors such as vibrations, temperature effects, air drafts, moisture absorption or moisture release of the weighing load, and electrostatic or magnetic interaction. It therefore can be important to choose the location where the balance is set up so that physical disturbance factors are avoided as much as possible. Further of importance for the measurement accuracy are factors related to the operation of the balance, for example setting the balance into a leveled position, the correct way of putting the balance into operation, the arrangement of the draft shield elements, the selection of an appropriate weighing container, and the positioning of the load on the weighing pan.

The internal and external factors described so far therefore determine the condition of the balance on which the measurement accuracy depends.

The manufacturer of the balance aims to continuously improve the properties of the different structural elements and signal-processing modules of the electronic force-measuring devices in order to eliminate, correct and/or compensate for internal and external disturbance factors that affect these elements and modules.

In order to eliminate internal factors, the optimization is directed at the load cells with their guiding constraints, coupling and pivoting elements, or the force/displacement transducers with the appurtenant sensor devices. In a force/displacement transducer, the linearity of the relationship between force and displacement travel can be of importance, wherein one aims to achieve reproducible elastic properties. As described in reference [1], specific requirements can include that the amounts of anelasticity, creep, and (mechanical) hysteresis should be as small as possible.

Measures that are taken to reduce or prevent external factors include for example a draft shield or vibration-damping mechanical elements.

In order to correct or to compensate internal and external factors affecting the measuring signal in spite of the foregoing measures, balances are equipped with a signal-processing unit with modules by means of which the signal delivered by the measurement transducer is filtered, corrected or compensated. Under ideal circumstances, measurement errors caused by creep, hysteresis, non-linearities, temperature gradients, vibrations and shocks, or electrical interference, etc., are thus completely eliminated.

A balance in which the drift phenomena caused by creep are corrected by a compensation for the drift-related components is disclosed in [4], U.S. Pat. No. 4,691,290. In the method that is used in this balance, a representation of the measured load and the status of the creep are determined and combined with each other in order to arrive at a measurement value that corresponds to the applied load, wherein the creep-related error components are compensated.

Furthermore, according to [4] the mathematical representation of the status of the creep is determined as a function of time, of the load being measured, and of the creep status that was determined at an immediately preceding time, in order to take factors into account that affected the balance previously.

The creep status in this balance is calculated based on constants that were determined and stored in the initial adjustment of the balance. According to [4], these constants need to be determined individually for each balance, because there are in most cases variations between different balances.

Important in balances with electromagnetic force compensation, to name an example, is the compensation of temperature drifts that occur after switching the balance on, as described in reference [6], U.S. Pat. No. 5,856,638.

In balances that are disclosed in reference [7], US 2004/0088342 A1, and reference [8], U.S. Pat. No. 6,271,484 B1, signals delivered by the measuring transducer are processed by means of variable digital filters.

With the method described in [7], the characteristics of the filter being used can be individually adapted to the oscillatory properties of the measuring system that is controlled by the filter. Therefore, the damping of the filter can be increased to any desired degree in a selected frequency range.

According to the method described in [8] a test is made as to whether the amplitude of the disturbance signals caused by vibrations lies inside a permissible range. If this is not the case, the filter characteristic is modified until the disturbance signals are again inside the permissible range.

There can be an interactive connection between internal and/or external influence factors as sources of disturbances. If a balance is set up at a location that is not optimal in regard to drafts, and if the draft shield on the balance was not optimally configured by the user, the occurrence of air drafts can affect the measurement results. As an additional factor in this, the effects caused by the air drafts are also dependent on the resistance that the load on the balance pan presents to air currents. The effects of air currents can therefore by reduced by selecting a more favorable location, by configuring the draft shield correctly and/or by selecting a more advantageous container for the weighing load. Furthermore, there is often also a load-dependent shift in the resonance frequency of the mechanical measuring system, which can be taken into account in setting the filter parameters.

The effects caused by the internal and external influences can therefore to a large extent be eliminated by the measures of the foregoing description. However, under very unfavorable conditions of the balance which occur, e.g., as a result of strong mechanical shocks or exposure of the balance to strong air drafts without a draft shield in place, it is often impossible to achieve a compensation for the influence factors or a correction of the resulting measurement error.

The disclosures of reference [1] to [9] are hereby incorporated by references herein in their entireties.

It has been found that in spite of the afore-described measures, it is still possible that unsatisfactory measurement results can occur which are caused for example by either a gradual or abrupt change in the afore-described internal or external influence factors.

SUMMARY

A method for the optimization of the behavior of an electronic force-measuring device is disclosed. The method can be used for operating a force-measuring device, in particular a balance.

An exemplary method serves to optimize the behavior of an electronic force-measuring device, in particular a balance, which comprises a measuring transducer that forms a measuring signal representative of a weighing load placed on the device, which measuring signal is delivered to a signal-processing unit that serves to process digital signals and is supported by at least one processor and at least one memory storage unit. Accordingly, by evaluating pertinent information a determination of first characteristic traits is made for the condition of the force-measuring device, said first characteristic traits being the result of internal and/or external factors affecting the force-measuring device, and/or second characteristic traits for the force-measuring device are determined from the analysis of at least one time profile of the measuring signal, for example taking the first characteristic traits into account, whereupon the condition of the force-measuring device is determined on the basis of the first and/or second characteristic traits, and the further processing of the measuring signal and/or the operation of the force-measuring device is controlled accordingly, depending on the condition that was determined.

The determination of the condition of the force-measuring device has numerous advantages and provides for example the possibility for an advantageous control of the processing and utilization of the signal as well as the targeted use of optimizing measures.

In an exemplary embodiment, at least two possible conditions are defined to which individually different method steps or actions are assigned which are performed as soon as the respective condition actually occurs.

In various embodiments, following the determination of a first condition wherein the first and second characteristic traits indicate no disturbance factors, the measuring signal is used for evaluation by the user and/or for the optimization of the force-measuring device.

When a second condition has been found wherein the characteristic traits indicate the presence of disturbance factors, the measuring signal is not used for evaluation by the user and/or for the optimization of the force-measuring device. For example, if permanent external factors such as vibrations are present, the filter parameters are optimized and the condition that has been determined is signaled to the user or to a connected data-processing unit. No parameter optimization takes place for the correction of internal factors which normally have only a weak influence on the measuring signal, since the external factors are stronger. Correction parameters that serve for the correction of slowly changing internal factors (e.g., creep) or external factors (e.g., temperature) can be called drift parameters. However, it needs to be noted that the filter parameters serve for the correction of abrupt changes (onset of vibrations, and shocks) as well as slow changes (slow shift of the resonance frequency of the measuring system or slow shift in the frequency of permanently present vibrations) of the internal as well as external factors. In consideration of this fact, the optimization of the drift parameters is typically not made when the conditions are unfavorable.

Disturbances in the time profile of a signal can be attributed to a source, specifically to changes of the internal or external factors such as a change in the weighing load, creep effects, hysteresis effects, temperature changes, or mechanical factors, whereupon a condition is determined accordingly. Based on the condition that was determined, the required correction measures or optimization measures can be initiated in a targeted manner.

The condition of the force-measuring device changes in most cases several times during the time when a measurement is performed. With a load change there are transient oscillations associated which can be used for the optimization of the filter parameters, but not for the optimization of further correction parameters (e.g., creep). Only the part of the signal profile that remains after the transients have completely settled can be used for the optimization of the parameters that are assigned to the correction of creep. A recorded signal profile can therefore be subdivided into segments, each of which is associated with a specific condition. A determination can further be made for the so defined segments that based on other factors a non-suitable condition exists for performing the optimization. This occurs for example in a case where the segment containing the transients has other oscillations superimposed on it which are caused by a strong mechanical shock.

In determining the condition, it is further advantageous that there is a simple way to take the amount of preceding positive or negative load changes as well as the absolute magnitude of the load into account. This is of significance for example because the properties of the balance can change dependent on the weighing load. For example, with a larger weighing load the resonance frequency of the mechanical measuring system shifts downward, a fact that can be taken into account in setting the filter parameters. Thus, with a more accurate determination of the static and/or dynamic condition of the balance, the optimization of the correction parameters can be made faster and more precisely.

In an exemplary embodiment, currently recorded signal profiles are used for optimization of the correction parameters. Older signal profiles are used to perform plausibility checks. The number of signal profiles or segments thereof, divided into categories, can therefore be strongly reduced over time.

With the measures according to the exemplary embodiments, one can carry out a precise and fast optimization of the correction parameters, as the registered signal profiles are based on a non-disturbed behavior of the balance and stable measurement conditions. Furthermore, the measuring results can be optimized by retroactively rejecting individual measurement values that were recorded under unfavorable conditions of the force-measuring device.

BRIEF DESCRIPTION OF THE DRAWINGS

Details of the exemplary methods of optimizing the behavior of a force-measuring device and exemplary force-measuring devices may be learned from the description of the embodiments in conjunction with the drawings, wherein.

DETAILED DESCRIPTION

Figures 1, 2:
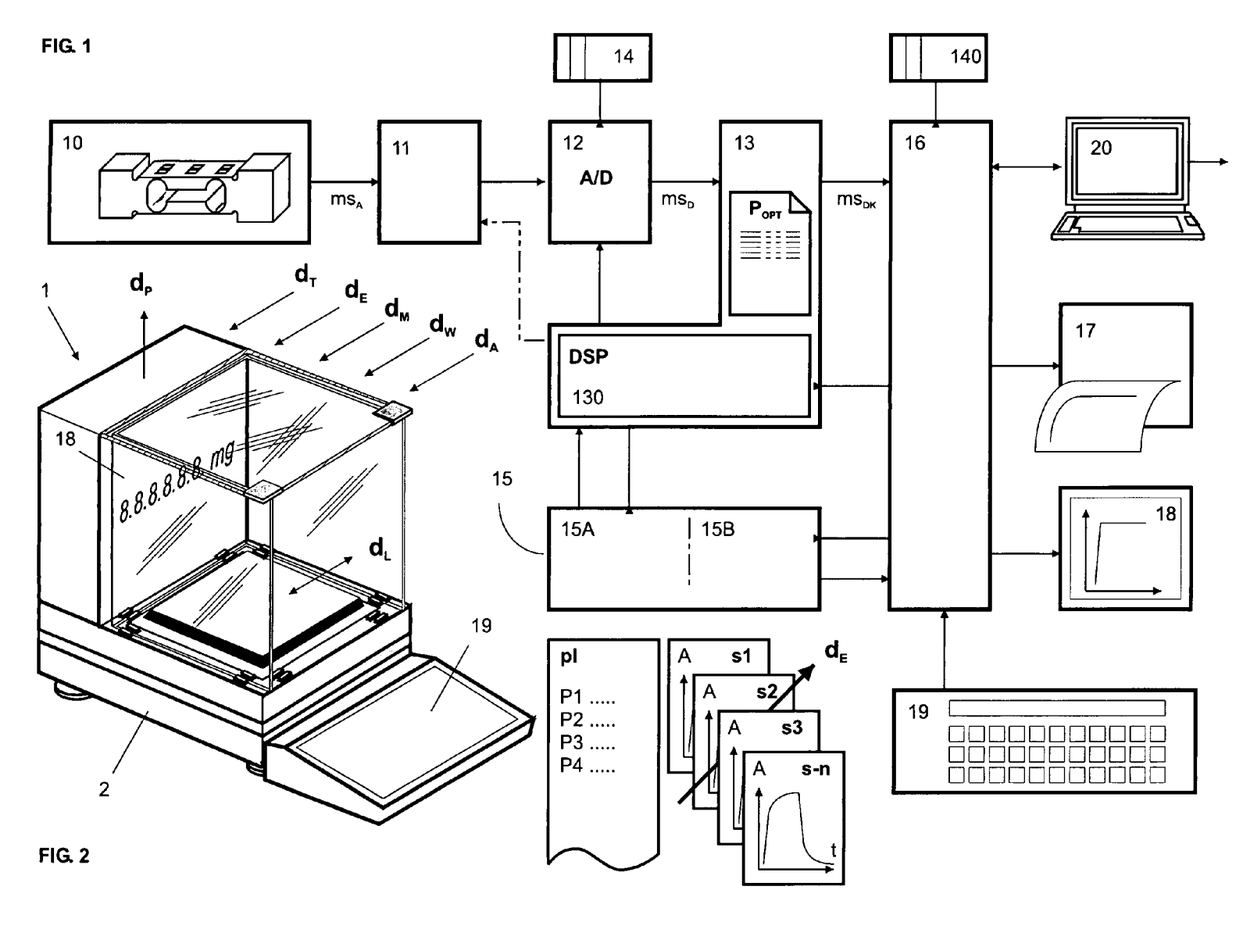
FIG. 1 represents an exemplary block diagram of the balance 1, with a digital signal-processing unit 13 and a signal processor 130 which is controlled by a program $P_{OPT}$, so that it has the capability to perform an exemplary method as disclosed herein.
FIG. 2 represents an exemplary balance 1 with symbolically represented influence factors $d_A$, $d_E$, $d_M$, $d_W$, $d_T$, $d_L$, which can cause a disturbance in the time profile of the measurement signal ms.
Figure 3:
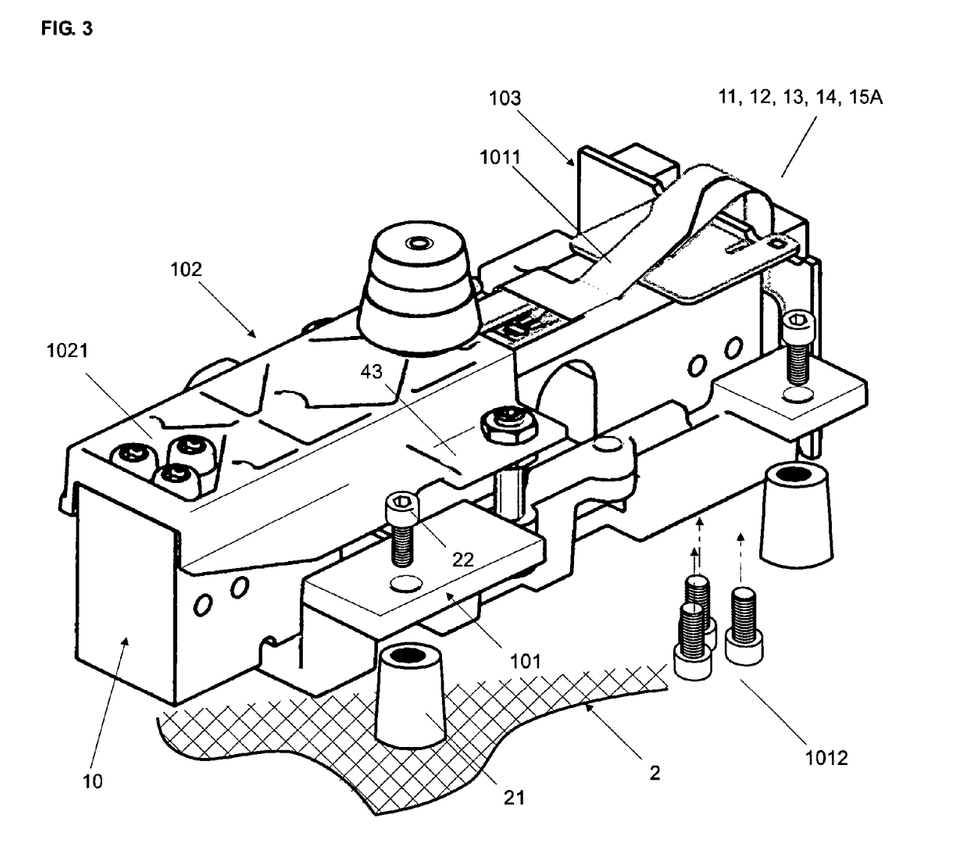
FIG. 3 represents an exemplary measurement transducer 10 including components provided for its operation which are suitable for carrying out an exemplary method of optimizing the behavior of a force-measuring device.

FIG. 1 represents as an example the block diagram of an exemplary balance 1 that is illustrated in FIG. 2, which has a measurement transducer 10, for example the force-measuring cell described in [5] and illustrated in FIG. 3, consisting of a transducer body 10 with strain gauges that is connected by means of screws 1021, 1012 to a weighing pan carrier 102 and to a mounting part 3 which, in turn is connected to the housing 2 of the balance 1 by means of screws 22. The strain gauges are connected by way of a flat-ribbon cable 1011 to a circuit module 103 on which the modules 11, 12, 13, 14, 15A are arranged which will be described in more detail below and which serve for the signal correction among other functions. The modular force-measuring cell which is shown in FIG. 2 as an example has special advantages which are described in reference [5]. However, the method disclosed herein can also be realized with any other design structure of the balance 1 or with any other force-measuring devices.

An analog measuring signal $ms_A$ representing a load is delivered by the measurement transducer 10 by way of a first signal-processing unit 11 serving to process analog signals to an analog/digital converter 12 which produces the digitized measuring signal $ms_D$ and passes it on to a second signal-processing unit 13 serving to process digital signals, wherein the digitized measuring signal $ms_D$ is corrected on the basis of correction parameters P1, P2, . . . in such a way that signal deviations due to disturbances caused by internal and external factors are compensated. To perform this function, the second signal-processing unit 13 is equipped with a processor 130, preferably a signal processor, and connected to a memory unit 15, more specifically 15A. To perform the method, an optimization program $P_{OPT}$ is executed by the signal processor 130, which program is stored in the memory unit 15 along with listings p1 of the correction parameters P1, P2, . . . and recorded signal profiles s1, s2, . . . whose purpose will be explained below.

The corrected digital measuring signal $ms_{DK}$ is delivered from the second signal-processing unit 13 to a main processor or host processor 16 which is connected to the memory unit 15, 15B, to an entry unit 19, for example a keyboard, to a display 18, for example a liquid crystal display, to a printer 17 and to a central computer 20. The division of tasks between the processors 130 and 16 in the execution of the method can be based on an arbitrary decision. The signal processor 130 can, e.g., perform only individual process steps under the control of the main processor 16 and pass the results on for further processing. Accordingly, the memory areas 15A, 15B of the memory unit 15 are either divided in their tasks or used in common. However, strictly required in principle is only one processor which is suitable to execute the operating programs provided for the processes to be performed.

FIG. 1 further shows that the signals which describe the condition of the balance 1 and/or extraneous influence factors can be sent from sensors 14 by way of the analog/digital converter 12 to the signal processor 130 and directly from sensors 140 to the main processor 16.

A balance with electromagnetic force compensation (MFC balance) is described, e.g., in [9], METTLER-TOLEDO Weighing Lexicon (06/92 edition), pages 48-50. This MFC balance is equipped with a built-in calibration weight which can be lowered by means of an electronically controlled motor.

As has been explained above, the measuring accuracy of a balance, be it an MFR balance or an S/G balance, depends on the condition of the balance. Therefore, to increase the measuring accuracy, the measures described in [1], [2], and [3] are used, by means of which the condition of the balance 1 is optimized. In addition, internal and external disturbance factors are corrected or compensated as is described, e.g., in reference [4] for the case of creep effects. After these measures have been carried out, the condition is assumed to be optimal.

However, it is possible that the user is not implementing a recommended measure optimally, that external influence factors change unforeseeably, or that the properties of the balance 1 itself undergo a change, so that the balance 1 is no longer in an optimal condition.

In an exemplary embodiment, a determination of first characteristic traits of the condition of the balance 1 is made, which traits are the result of factors affecting the balance 1, and/or second characteristic traits for the condition of the balance 1 are determined from at least one time profile of the measuring signal, whereupon the condition of the balance 1 is determined on the basis of the first and/or second characteristic traits, and the further processing of the measuring signal and/or the operation of the balance 1 is controlled accordingly, depending on the condition that was determined.

The first characteristic traits for the condition of the balance are determined and processed based on information relating to:
a) manually or automatically set operational parameters, correction parameters, and/or instrument configurations; and/or
b) manually or automatically performed applications; and/or
c) times of operation of the balance 1; and/or
d) the temperature of the balance 1 and/or or the ambient atmosphere; and/or
e) the atmospheric humidity; and/or
f) mechanical influence factors such as vibrations or shocks; and/or
g) factors introduced into the balance, in particular the quality of the line power supply; and/or
h) the weighing load; and/or
i) the entries made by the user which determine the operation of the balance 1.

The configuration of the balance 1 can be set by the user. For example, an exemplary embodiment guides the user through a display menu that is integrated in the balance. The settings of the balance 1 are therefore already stored in the memory unit 15. The manual or automatic settings of the draft shield, of doors or further partitioning elements can be detected by means of sensors 140 and signaled to the processor 16. The times of operation of the balance 1, which are of significance for the operating temperature, or previously performed sequences of measurements which can have a significant influence on the condition of the force-measuring cell in particular with regard to hysteresis and creep, can be precisely registered. The data which have been entered regarding the application to be performed are likewise stored in the memory unit 15. Information concerning the temperature and the atmospheric humidity or mechanical influence factors can be determined by means of sensors 14 and sent by way of the A/D converter 12 to the signal processor 130 or to the main processor 16. Information concerning the quality of the line power supply can be determined by analyzer circuits. Information concerning the weighing load can be determined by sensors or entered by the user. For example, the user may enter that a certain substance is being measured for which it has been registered that it absorbs moisture, so that its weight can change during the measurement, dependent on the prevailing atmospheric humidity. Also, it is possible to enter a definition of the measuring container being used.

The second characteristic traits for the condition of the balance can be determined, for example, in consideration of the first characteristic traits in that, based on an analysis of at least one uncorrected or only partially corrected signal profile, the linearity or drift profile of the latter, for example, in both the application and the removal phase of the weighing load, is tested and evaluated. Furthermore, signal oscillations of high or low frequency can be measured, such as signal noise or oscillations of the amplitude caused by mechanical vibrations. By taking the first characteristic traits into account, the relevant second characteristic traits for the condition of the balance can be determined in a target-focused and precise manner.

The first characteristic traits for the condition of the balance can therefore also be called direct characteristic traits, and the second characteristic traits can be called indirect characteristic traits. The second or indirect characteristic traits are particularly valuable as they were extracted from the measuring results, i.e., from the behavior of the balance 1 which depends to a significant extent on the condition of the balance 1. However, it is not so much the condition but rather the behavior of the balance 1 that can be of primary importance to the user. The purpose of optimizing the condition is to achieve the most ideal behavior possible. If a first characteristic trait indicates a questionable condition, this is of lower importance if at the same time the second characteristic traits prove an optimal behavior. If on the other hand the first characteristic traits indicate an optimal condition, but the second characteristic traits indicate an unsatisfactory behavior, the second characteristic traits are given priority in the evaluation. The second or indirect characteristic traits of the condition of the balance can therefore also be called behavior traits. By means of the latter and in some cases by giving additional consideration to the first characteristic traits, a backward-looking conclusion can be formed about the dynamic behavior of the balance, about its static condition (correct parameter settings and configuration) as well as about the prevailing ambient conditions (air drafts, temperature, humidity, vibrations, etc.).

The second characteristic traits can provide information relative to external factors (such as air drafts, vibrations, electrical disturbances) as well as internal factors (such as creep or hysteresis) which cannot be detected by means of the sensors 14, 140, but which are characteristic for the behavior and the quality of the balance 1.

By means of the second characteristic traits one can therefore also determine whether the condition and the behavior of the balance are significantly affected by external or internal factors. If external influence factors are present, the user can be alerted through appropriate signals to correct them, for example by optimizing the draft shield, optimizing the installation setup of the balance, or optimizing the power supply). If internal influence factors (creep, hysteresis, non-linearity) or external factors (mechanical effects, vibrations, shocks, air currents, temperature changes) are found to be present, there is further the possibility that a program-controlled process is started by means of which the correction parameters, in particular the filter parameters, the creep parameters, linearity parameters, hysteresis parameters, or temperature-compensation parameters are optimized.

Thus, as variously exemplified, determining the condition of the balance 1 has numerous advantages and provides for example the possibility of an advantageous control of the signal processing and signal evaluation as well as the use of optimizing measures.

In an exemplary embodiment of the balance, if a first condition has been found where the first and second characteristic traits indicate that no disturbance factors are present, the measuring signal is used for the evaluation by the user and/or for the immediate or later optimization of the balance 1.

When a second condition has been found where the characteristic traits indicate the presence of disturbance factors, the measuring signal is not used for the evaluation by the user and/or for the optimization of the balance 1.

An example of a case where an optimization is not performed is in the presence of a disturbance of only short duration; for example if a strong shock has been detected.

There is further no optimization performed for the correction parameters assigned to drift compensation, if vibration disturbances have been detected. The latter can on the other hand be used to optimize the filter parameters.

Figure 12:
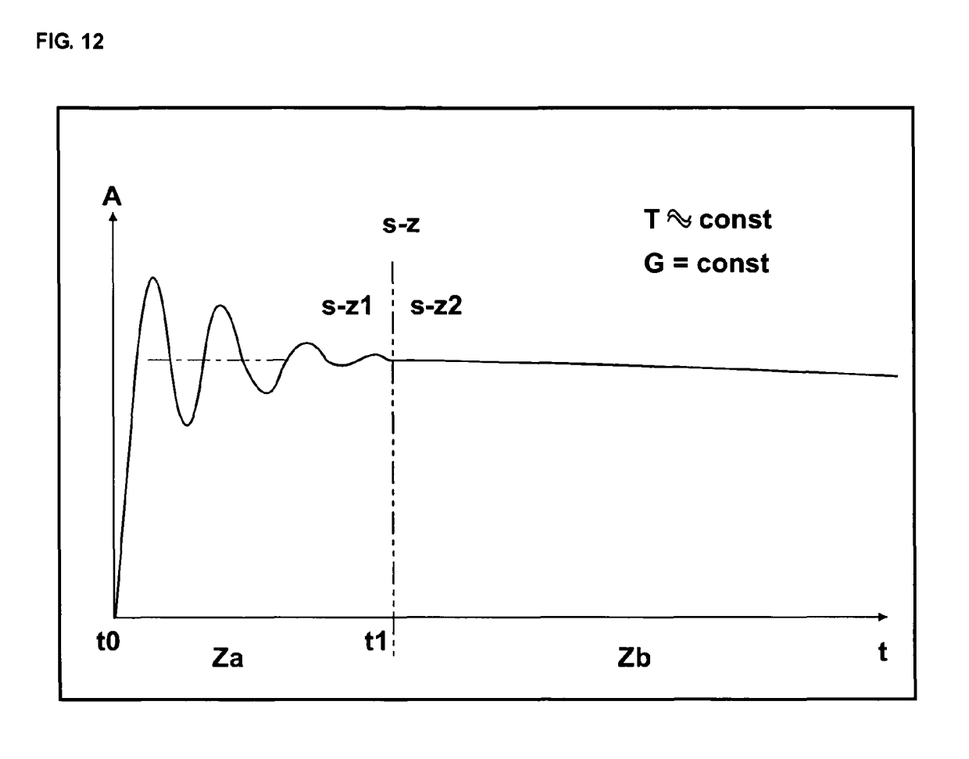
FIG. 12 represents an exemplary signal profile s-z with two segments s z1 and s-z2 for which different conditions Za and Zb of the balance 1 were determined.

Furthermore, after the condition has been determined it can be signaled to the user or to a connected data-processing unit. Based on the condition that was determined, it is further possible to carry out individual correction measures. A condition can therefore be suitable for performing a certain procedure but unsuitable for performing another procedure. A signal profile or segment of a signal profile which includes oscillations can for example be used for the optimization of the filter parameters. The condition that relates to this case, indicating an immediately preceding change in the load or the presence of vibrations, is therefore not intended to be used for an optimization of the drift parameters. FIG. 12 illustrates a signal profile s-z with segments s-z1 and s-z2 lying before and after the time t1, respectively, where respective conditions Za and Zb can be attributed to the segments. In the condition Za there are still oscillations present that were caused by the change in the load but will have settled down after the time t1. The first segment s-z1 can therefore be used for the optimization of the filter parameters, and the second segment s-z2 can be used for the optimization of the creep-related parameters, with the segments being appropriately identified and stored. If an unsuitable condition was found for the second segment s-z2, it is possible to store only the first segment s-z1, whereby memory space can be kept free.

Figure 9:
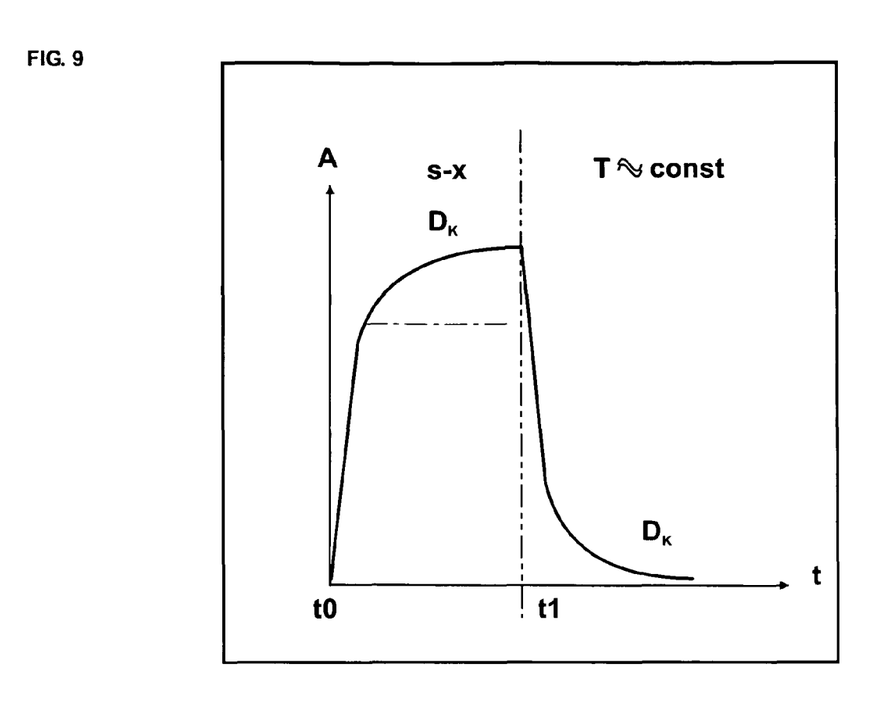
FIG. 9 represents an exemplary signal profile s-x recorded in the presence of creep effects.

The signal profile s-x shown in FIG. 9 illustrates the condition of a balance 1 characterized by the presence of a an undesirable creep component that was not adequately corrected. This signal profile s-x can serve as the basis of the optimizing procedure that addresses the creep effect. This condition, while unsuitable for the evaluation of the measurement signals by the user, is well suited for the evaluation of the measurement signals in regard to performing the optimization of the correction parameters for the creep phenomenon. This situation shows the significance of making a determination of the condition of the balance 1, which permits taking the measures that are appropriate and necessary in a given case.

FIG. 2 shows an exemplary configuration of a balance 1 that is suitable for performing the method disclosed herein, wherein the components 10, 11, ... that are shown in FIG. 1 are integrated in a housing 2.

Symbolically shown are a number of influence factors (not representing a complete list) which were described above, including influence factors $d_A$ caused by the user, influence factors $d_E$ related to the line power supply, mechanical influences $d_M$, influence factors $d_W$ related to air drafts, effects of temperature changes $d_T$, and effects $d_L$ caused by changes of the weighing load, all of which determine or at least affect the condition of the balance 1 and the measurement behavior of the balance 1, more specifically the dynamic profile of a measurement.

Also of significance in exemplary embodiments are interactive effects between the load and the environment. For example, a weighing load can release moisture into or absorb moisture from the ambient air. Furthermore, a continuous heat exchange takes place between the weighing load and the environment, whereby undesirable convective air currents can be caused. The release or absorption of moisture or the convection caused by heat exchange can lead to changes in the measuring signal which are superimposed on a signal change that is caused by creep effects. If the creep-related signal change of the balance is compensated correctly by the signal-processing unit 13, there remains a component of the signal change that is caused by a change in the load, which should not be interpreted as creep for the optimization steps which will be described below. If a change in the indication by one or more digital divisions is not caused by creep but by a change in the weighing load or other factors, this can be noted and the associated signal profile s-x can be disregarded for the optimization of the creep-related correction parameters.

Figure 10:
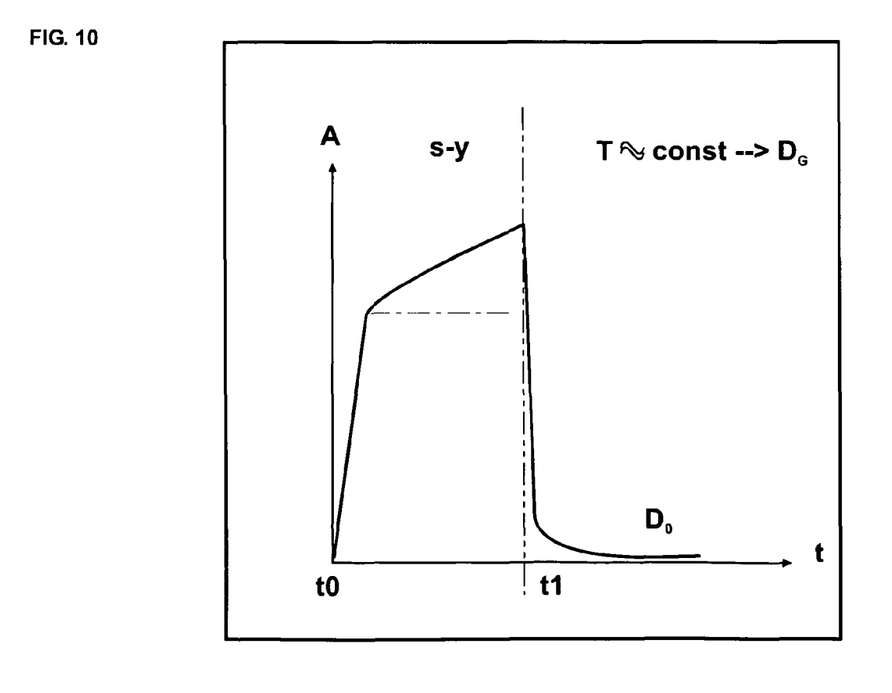
FIG. 10 represents an exemplary signal profile s-y recorded in the presence of a weight change of the weighing load.

FIGS. 9 and 10 illustrate exemplary signal profiles s-x and s-y, respectively, where the analysis of the signals leads to the conclusion that a creep effect is present in the signal profile s-x, while s-y reflects a continuous change of the weight $D_G$. In each case, the time t0 marks the placement of the load, while t1 marks the removal of the load. In the case of creep, the application and removal of the load lead to similar deformation behaviors of the structural elements, so that signal profiles in the respective time segments are symmetric to each other as illustrated in FIG. 9. After the beginning of the load application, the signal profile s-y in FIG. 10 is characterized by an approximately linear rise of the signal, which could be caused by temperature- or weight changes. A creep effect has to be excluded because the respective segments of the signal profile s-y for the application and removal of the load are completely different. Since the temperature measurement indicates constant values, it has to be concluded that a weight change is present, as can subsequently be confirmed for example based on the measurement of the air humidity and the available information about the weighing load. It is also possible for example to evaluate measuring signals by means of a Fourier transformation which can indicate, e.g., that disturbing signal components lie in the frequency range of the line power supply. The evaluation of the signal profile therefore includes the evaluation of the measuring signal ms during any desired process phase.

Disturbances in the signal profile are therefore attributed to a source factor such as a change of the weighing load, creep, hysteresis effects, temperature changes, or mechanical influence factors, whereupon a condition is determined that fits the nature of the disturbances. Based on the condition that was determined, appropriate correction- or optimization measures can be initiated in a target-focused manner. Dependent on the nature of the disturbance, the appropriate correction parameters, filter parameters, or parameters for drift correction modules are optimized.

In the investigation of drift phenomena of electronic balances, it has been found that these phenomena depend not only on changing influences of the environment and drift behavior that was determined at one time for the structural elements of the balance described hereinabove. Additionally, it has been concluded that the drift phenomena occurring in balances depend to a significant extent on changes in the drift behavior of the afore-described structural elements, which changes take place over an extended time period in the course of the operation of the balance. Instead of tolerating the presence of the drift phenomena or to have them removed by sending the balance back to the factory, balances disclosed herein can have the capability for an adaptive correction of those drift phenomena that develop gradually at the user location after the balance has been factory-adjusted and delivered and which are dependent on internal and external influence factors.

For the adaptive correction of drift phenomena such as changes related to creep, hysteresis, linearity, temperature, or abrupt changes such as the onset of vibrations, the condition that exists for the balance 1 during the recording of signal profiles based on which the balance is to be optimized can be determined.

Signal profiles s1, . . . , s-n that are not intolerably compromised by one or more of the interference effects $d_A$, $d_E$, $d_M$, $d_W$, $d_T$, $d_L$ shown symbolically in FIG. 2 are used for the optimization of the balance 1. For example, an electrical disturbance $d_E$ was registered in the recording of the signal profile s2; therefore the signal profile s2 is not used for the optimizing process and may in some cases not even be stored in memory. The identifying time information stored with each of the signal profiles s1, . . . , s-n provides for example the possibility to monitor the aging or to indirectly check the quality of the signal profiles s1, . . . s-n. Signal profiles s1, s-n which have already been taken into account in a previous optimization of the balance are preferably erased from the memory unit 15. Signal profiles s1, . . . , s-n which were initially qualified as usable and were stored, can still be rejected later if several other disturbances are found to have occurred at the registered time of a signal profile. For example, an alert can be sent from a central computer 20 to the balances installed at decentralized locations that on a given date XX/XX/XXXX, an electrical disturbance occurred between the times YY.YY and ZZ.ZZ whereby different systems were detrimentally affected. Signal profiles s2 that fall into this time frame and are therefore suspect can thus be rejected in the balance 1.

FIG. 1 shows exemplary time profiles of signals s1, . . . , s-n which were recorded in the presence of a first or other suitable condition, wherein said signal profiles are registered in the memory unit 15; 15A, for example in a ring buffer in said memory unit, either in the form of continuous amplitude profiles as functions of time or as value pairs of amplitude and time, for example, together with their identifying time- and/or date information. The signal profiles s1, . . . , s-n are not corrected or are corrected only partially, so that they provide unaltered information about the measuring process and the measurement device. Typically, the ring buffer 15; 15A receives raw values at the rate of the system cycle period for intermediate storage before they are analyzed.

In an exemplary embodiment, the stored signal profiles s1, s3 . . . , s-n are used for the optimization of the balance 1. The balance 1 can be optimized not only in the initial adjustment at the factory but also repeatedly at later times at the user location. In the optimization procedure, correction parameters are defined which serve for the correction of signal deviations that are caused by slow or abrupt changes of the internal or external influence factors.

Further, correction parameters P1, P2, . . . can be defined which serve for the correction or compensation of signal deviations that are caused by internal or external influences. These correction parameters P1, P2, . . . can be reexamined repeatedly or under the control of a corresponding program after the installation of the balance 1 at the user location and adapted to the slow or abrupt changes in the properties of the balance 1. In some cases, the correction parameters are checked again and/or are presented to the user for acceptance before starting an application.

The following explanation is intended as an example to show the optimization of correction parameters that serve for the correction of signal deviations that are caused by creep. In this context, a signal deviation recorded over a certain time period is referred to as signal drift.

Figure 4:
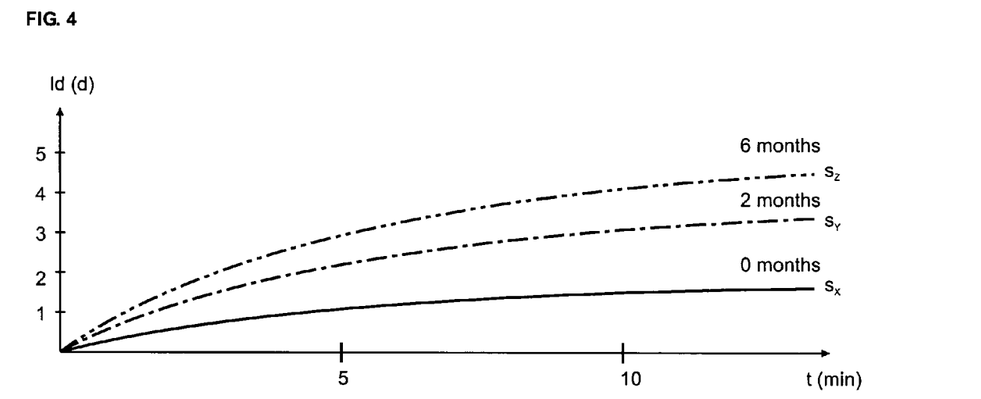
FIG. 4 represents exemplary non-corrected drift profiles recorded at time intervals of several months.

FIG. 4 illustrates exemplary changes in the creep-related drift behavior of the balance 1. The graphs which were recorded in time intervals of several months show uncorrected drift profiles $s_x$, $s_y$, $s_z$ which occur after placing a load on the balance. The curves indicate the changes in digits or display units which are observed in the display within a time frame of 15 minutes. This illustrates that the creep-related drift behavior of the balance 1 changes over time.

Figure 5:
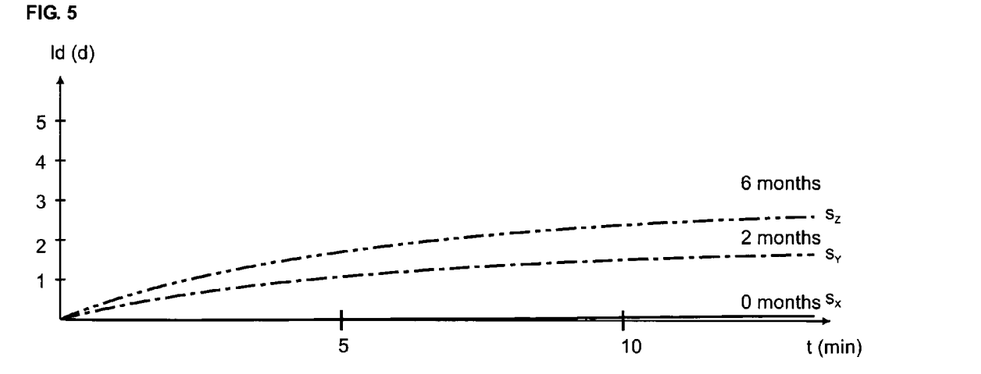
FIG. 5 represents exemplary drift profiles recorded at time intervals of several months, which were corrected by correction parameters that were fixedly set at one time.

If the drift deviations were compensated correctly on the basis of the static correction parameters P1, P2, . . . in the original adjustment, this will result in the corrected drift profiles $s_x$, $s_y$, $s_z$ which are shown in FIG. 5. The first profile $s_x$ at 0 months shows practically no drift. However, because of changes in the instrument properties, undesirable drift components will show up again after the illustrated intervals of two months and six months, respectively, which are corrected in accordance with the method of the invention, as will now be described.

An exemplary method is initiated for example automatically in fixed time intervals, automatically after undesirable drift deviations have been found, or manually by the user.

Figure 7:
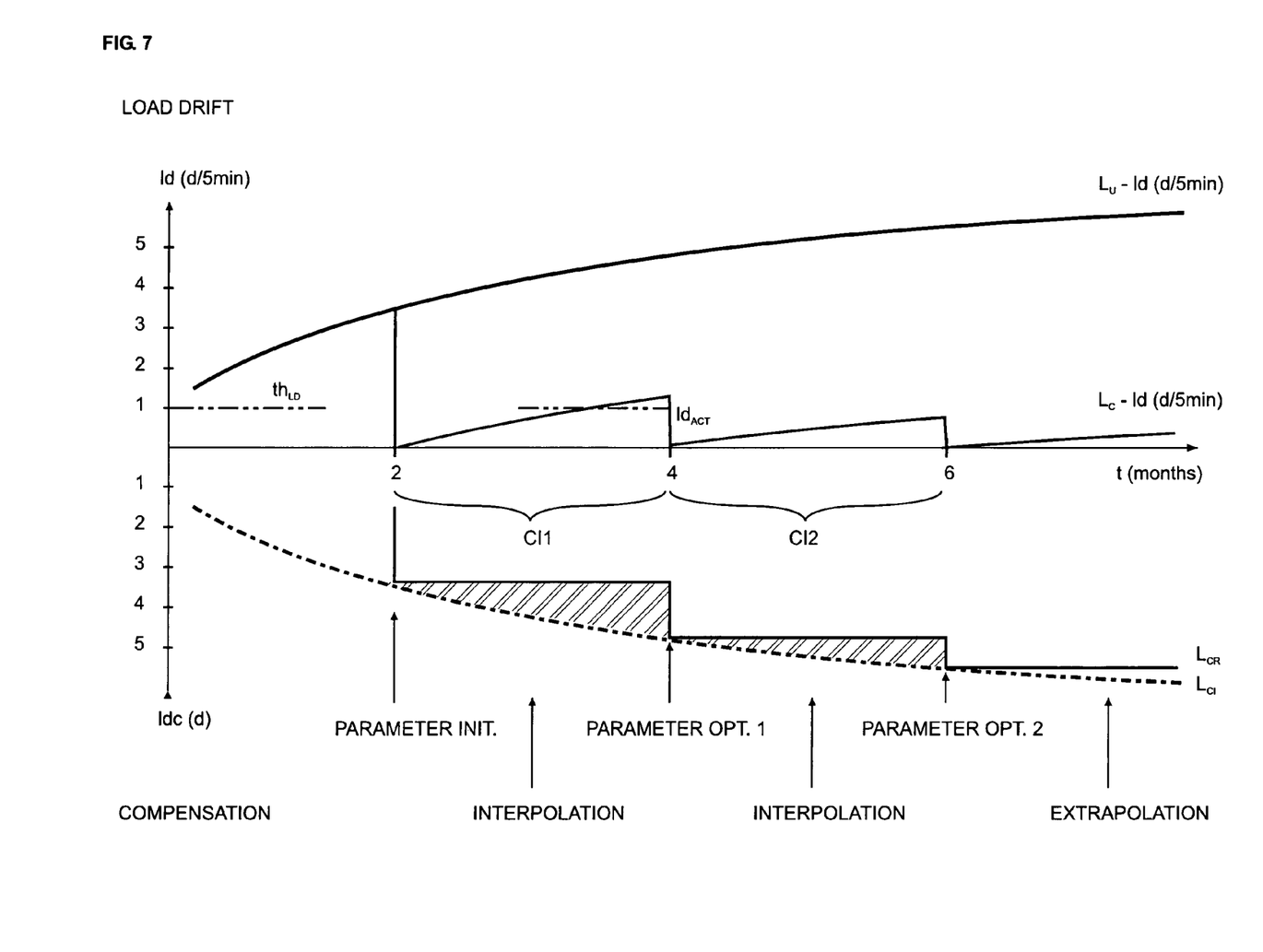
FIG. 7 represents exemplary time profiles $L_U$, $L_C$, extrapolated over several months, of the compensated and non-compensated drift components which occur as a result of creep within five minutes after a load has been applied, as well as the actual profile $L_{CR}$ of the correction values that were adapted according to the invention, and the extrapolated profile of ideal correction values.

For example, the magnitude $ld_{ACT}$ of currently occurring drift phenomena is determined on the basis of at least one stored signal profile s1, . . . , s-n, which should, for example, be as close to current as possible, and compared to an associated threshold value $th_{LD}$, whereupon after the threshold value $th_{LD}$ has been found to be exceeded, the method for optimizing the correction parameters P1, P2, . . . is carried out (see FIG. 7).

For the optimization of the values of the correction parameters P1, P2, . . . , for example individual ones of the previously registered signal profiles s1, s3, . . . are retrieved from the memory unit 15 and sequentially entered into the signal-processing unit 13 in which the correction of drift phenomena takes place based on new values for the correction parameters P1, P2, . . . , whereupon the corrected signal profiles s1, s3, . . . are evaluated and optimized values for the correction parameters P1, P2 are stored in memory. Currently recorded uncorrected signal profiles s1, s3, . . . can be taken out of the memory unit 15 and delivered to the signal-processing unit 13 in which the correction method is executed on the basis of the current correction parameters P1, P2, . . . The signal profile is subjected to variations by making changes in the correction parameters until an optimal profile has been found. For example, a stepwise examination is made of the signal profiles s1, . . . , s-n starting from the current values for the correction parameters, wherein for each step of the examination a test value is calculated, possibly after averaging the measuring results, as a measure for the goodness of the correction that has been achieved. The test values that were determined for each step of the examination are subsequently compared to each other, whereupon the values for the correction parameters P1, P2, . . . associated with the best test value are stored in memory as the new current values. After new values have been determined for the correction parameters, they are preferably checked for their plausibility when put in relation to earlier recorded signal profiles.

Figure 6:
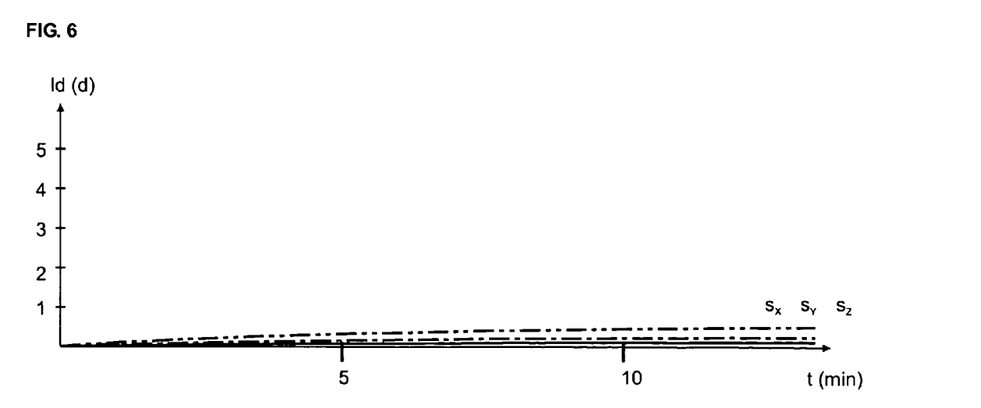
FIG. 6 represents exemplary drift profiles recorded at time intervals of several months, which were corrected by adaptively updated correction parameters.

FIG. 6 shows exemplary signal profiles $s_x$, $s_y$, $s_z$ corresponding to the signal profiles of FIG. 4 after a practically complete correction by means of individually adapted correction parameters P1, P2, . . .

To supplement the foregoing explanation, the method disclosed will now be further discussed with reference to FIG. 7 under a different angle of view. A curve $L_U$ is shown which represents the uncompensated creep-related drift behavior or, more specifically, the change over several months in the drift values that occur five minutes after placing a load on the balance. The curve $L_U$ was recorded through sequential measurements and interpolation of the measurement values.

The curve $L_{CR}$ shows the stepwise change of the compensation values that are adapted in intervals of two months based on the adaptively adjusted values of the correction parameters P1, P2, . . . The sawtooth-shaped curve $L_C$ illustrates the creep-related drift behavior of the balance 1 which has been optimally corrected at specific points within intervals C11, C12, . . . on the basis of the compensation values $L_{CR}$.

Also shown is a threshold value $th_{LD}$ as provided in exemplary embodiments, which threshold corresponds to a maximally tolerable drift deviation and, when it has been exceeded, represents the criterion for carrying out the method according to the invention. As a result, the disclosed method is in each case executed no sooner than necessary and as late as possible.

Also drawn in the graph of FIG. 7 is an exemplary curve $L_{CI}$ which was determined by interpolation and extrapolation which gives an approximation of the ideal compensation values. The extrapolated part of the curve can be used for the optimization of the sawtooth-shaped curve $L_C$ and thus for the further optimization of the drift behavior of the balance 1.

Figure 8:
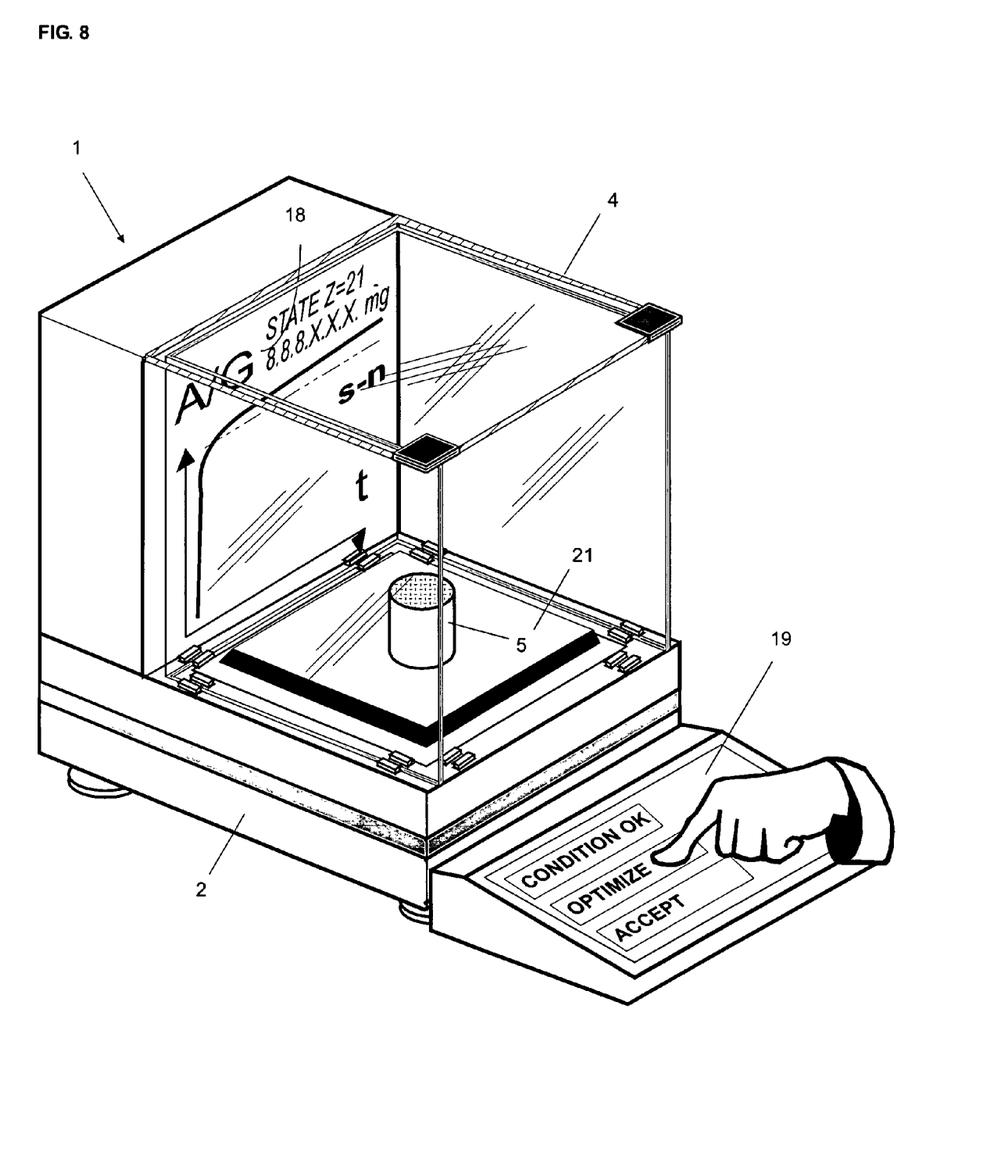
FIG. 8 represents an exemplary balance 1, which has the capability to perform the method disclosed herein either automatically or semi-automatically.

FIG. 8 illustrates an exemplary balance 1 of FIG. 2 in a design configuration that is suitable for the automatic or semi-automatic execution of the disclosed method.

A load 5 has been placed by the user on the weighing pan 21 of the balance 1 and left there for an extended time period. The display 18, for example a liquid crystal display screen, indicates the signal profile s-n as registered during the time period t, from which the presence of a drift can be concluded.

In a balance with at least one automatically actuated calibration weight (see [9], pages 48-50), the foregoing process can also be performed without the assistance of the user. Nevertheless, it is also possible that the calibration weights are placed on the balance manually.

The display 18 indicates a state of the balance 1 (STATE 21) that is characterized by a drift phenomenon but is otherwise suitable for carrying out the optimization method. The user can now enter through the keyboard 19 that the balance is in a suitable condition to perform the optimization method. With a further press of a key, the user can start the optimization method and later, again by pressing a key, accept the optimized values for the correction parameters P1, P2, . . .

If the adjustment weight is placed on the balance automatically, there is also the alternative possibility for the optimization program to detect a drift automatically and to start the optimization method automatically, whereupon optimized values for the correction parameters P1, P2, . . . are stored either automatically or only after the user has confirmed them to replace the previous parameter values.

Thus, the values for the correction parameters P1, P2, . . . can be optimized with the balance 1 shown in FIG. 8 based on a currently recorded signal profile s-n. Alternatively, the balance 1 can also be designed for the automatic optimization of the values for the correction parameters P1, P2, . . . by means of signal profiles s1, . . . s-n that were previously registered. The user again has the possibility for each signal profile s that is to be stored and to be used later to confirm that the condition of the balance is suitable (see key or entry field <CONDITION OK>), to start the optimization method (see key or entry field <OPTIMIZE>) and to accept the optimized values for the correction parameters P1, P2, . . . as replacements for the previous parameters (see key or entry field <ACCEPT>).

In the manner according to the foregoing description, the correction parameters P1, P2, . . . that relate to the other internal and external influence factors can likewise be optimized.

Of significance in exemplary embodiments are the optimization of the correction parameters of the filters being used, by means of which the transient oscillations occurring with changes of the weighing load as well as the signal oscillations caused by vibrations and shocks are filtered. Optimizing the filter parameters has the purpose of achieving an optimal filtering of the output signal of the measurement transducer and at the same time a minimal settling time of the transient oscillations of the force-measuring device.

In the optimization of the filter parameters, the latter can for example be changed in steps until an optimal transient behavior is achieved so that the settling time is as short as possible, overshooting is kept to a minimum, and the signal is as stable and noise-free as possible, specifically that the combination of these characteristics is optimized.

Figure 11:
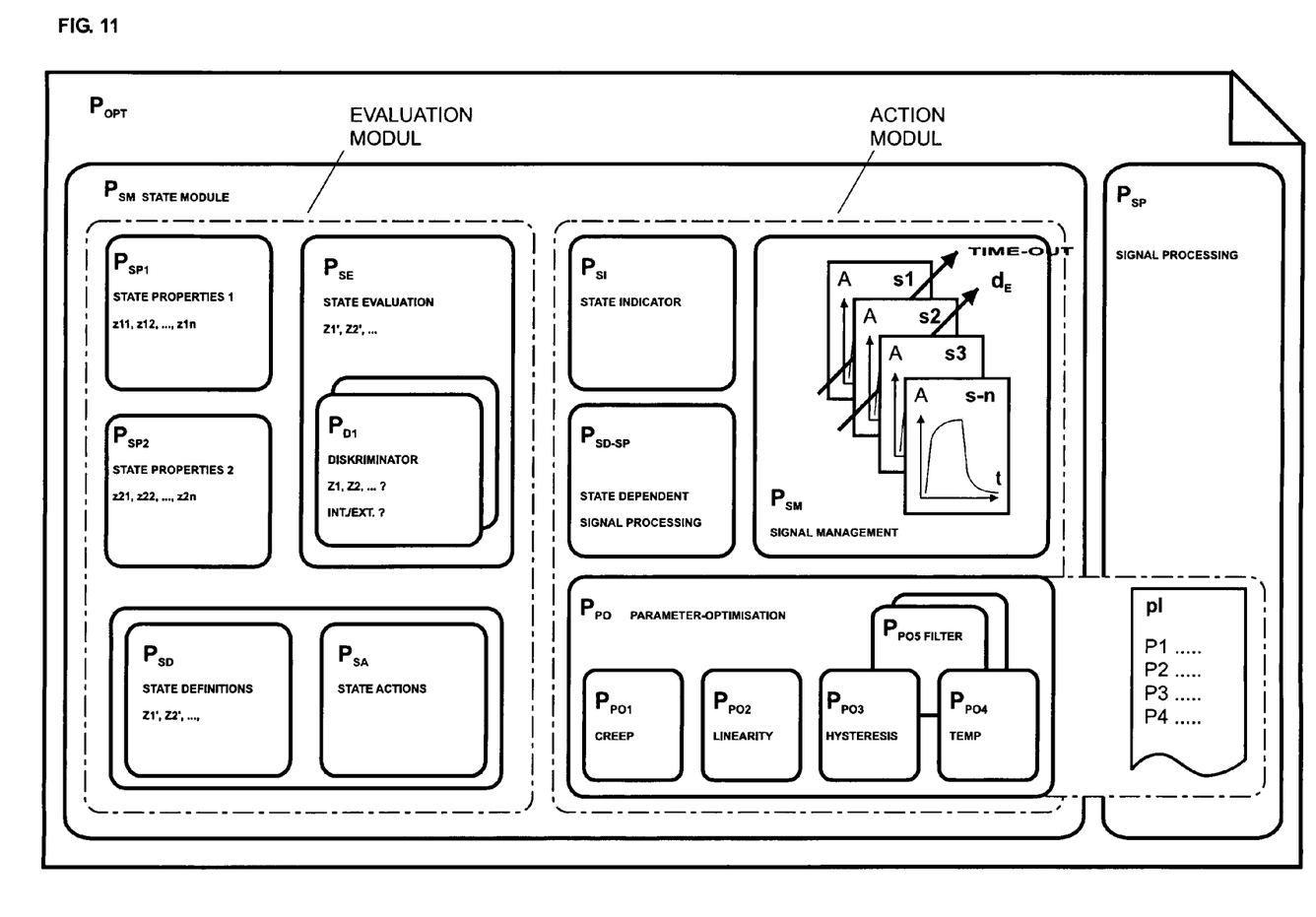
FIG. 11 illustrates exemplary modules of the program $P_{OPT}$ which serve to determine the condition of the balance 1 and to control the balance in accordance with the condition that was determined.

FIG. 11 illustrates an exemplary modular structure of the program $P_{OPT}$ which controls the optimization, including a signal-processing module $P_{SP}$ which in a known manner allows the correction by means of correction parameters P1, P2 for signal errors caused by internal or external influence factors.

To carry out exemplary implementations of the disclosed method, the program $P_{OPT}$ includes a condition-determining module $P_{SP}$ which allows the determination of the condition Z1, Z2, . . . of the balance 1 based on first and second condition-related characteristic traits $z11, \ldots, z1n, \ldots, z2n$. For the determination and preliminary processing of the first and second condition-related characteristic traits $z11, \ldots, z1n, \ldots, z2n$, the condition-determining module $P_{SP}$ has two characteristic-trait-related modules PSP1, PSP2 which deliver the information that has been determined to an evaluation module $P_{SE}$ that is equipped with at least one discriminator module PD1, which furthermore has the capability to access information in modules $P_{SD}$ and $P_{SA}$ where conditions Z1', Z2', . . . are defined which could potentially occur and actions that are to be initiated under each of these conditions, which actions are predefined by the manufacturer and/or by the user. With the discriminator module $P_{D1}$, it is now possible to determine which of the predefined conditions Z1', Z2', . . . is the best representation for the actually existing condition or for the first and second condition-related characteristic traits $z11, \ldots, z1n, z21, \ldots, z2n$, whereupon the predefined actions are initiated. By means of the discriminator module $P_{DI}$, it can also be determined for example whether internal or external disturbance factors are present. The condition that has been determined can be signaled by means of the indicator module $P_{SI}$. The measured signal ms can be processed by means of the module $P_{SD-SP}$ in a manner that depends on the condition Z that was determined. The measured signal ms can be rejected, indicated and/or stored for the optimization of the balance 1. The stored measurement signals ms or signal profiles s1, . . . , s-n can be administrated by the module $P_{SM}$ in such a way that only signal profiles 1, . . . , s-n that can be used for optimization processes are stored. Each of the signal profile s1, . . . , s-n can be a label indicating what optimization processes the signal profile can be used for. Signal profiles s1, s2 that are obsolete or have been compromised by disturbances are deleted from the memory 15 in order to limit the amount of memory that is used for this purpose.

Depending on the instructions that are sent from the evaluation module $P_{SE}$ or a further module of the program $P_{OPT}$, for example a threshold value module or a timer, the correction parameters P1, P2, . . . for individual error categories or for all error categories are optimized with the module $P_{PO}$. Individual correction modules $P_{PO1}, P_{PO2}, P_{PO3}, P_{PO4}, \ldots$ are provided for this purpose, by means of which modules in particular the filter parameters and/or the parameters P1, P2, . . . for the correction of creep effects, linearity errors, hysteresis effects, or temperature drifts are optimized. Optimized values of the correction parameters P1, P2, . . . are subsequently stored in the parameter list p1 where they are used by the signal-processing module $P_{SP}$ which performs the correction of the signal errors.

As a matter of course, the required communication paths are provided between the individual modules as needed to perform the tasks described above.

Exemplary methods and exemplary balance 1 have been described and illustrated in exemplary embodiments. The force-measuring device has been described in the form of a balance 1. However, exemplary embodiments can also be used in other force-measuring devices such as gravimetric measuring devices, weighing modules, load cells and force sensors which may in some cases constitute part of a balance. The exemplary methods can be used in many ways and is not limited to the explicitly named factors which can cause signal deviations that are to be corrected. Of course, the exemplary methods are furthermore not limited to a specific selection, configuration, grouping and application of the correction parameters P1, P2, . . . The concept of determining the condition of the balance is of significance for all optimization processes that are to be carried out, although exemplary methods for optimizing the creep-related correction parameters has been described.

For the memory storage of signal profiles s1, . . . , s-n, a variety of centralized or decentralized arrangements of storage media can be used, such as for example recording devices with magnetic or optical means for writing and reading as well as static or dynamic semiconductor memories.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

Literature References
[1] EP 0 945 717 A1
[2] "Bauen Sie Ihre Qualität auf solidem Grund!" (Build your Quality on Solid Ground!), company publication, Mettler Toledo GmbH, January 2001
[3] "Wägefibel" (Weighing Primer), Mettler Toledo GmbH, April 2001
[4] U.S. Pat. No. 4,691,290
[5] WO 03/078937 A1
[6] U.S. Pat. No. 5,856,638
[7] US 2004/0088342 A1
[8] U.S. Pat. No. 6,271,484 B1
[9] METTLER-TOLEDO Weighing Lexicon (edition 06/92)

What is claimed is:

1. A method for the optimization of the behavior of an electronic force-measuring device that comprises a measuring transducer through which a measuring signal is formed which is representative of a load applied to the force-measuring device, which measuring signal is delivered to a signal-processing unit that is supported by at least one processor and at least one memory storage unit and serves to process digital signals, the method comprising:

determining by evaluating pertinent information, first characteristic traits for the condition of the force-measuring device, said first characteristic traits being the result of at least one of internal and external factors affecting the force-measuring device;

determining second characteristic traits for the force-measuring device from the analysis of at least one time profile of the measuring signal, taking the first characteristic traits into account;

determining the condition of the force-measuring device, on the basis of the first and second characteristic traits; and controlling at least one of the further processing of the measuring signal and operation of the force-measuring device depending on the condition of the force-measuring device;

wherein the controlling includes determining whether the measuring signal is used in an optimization of the electronic force-measuring device.

2. The method according to claim 1, wherein at least two possible conditions are defined to which individually different method steps are assigned which are carried out as soon as an actual condition occurs that corresponds to one of said at least two possible conditions.

3. The method according to claim 2, wherein
a) after a first condition has been determined according to which the condition-related characteristic traits do not indicate the presence of disturbance factors,
a1) the measuring signal is used for evaluation by the user; and/or
a2) the measuring signal is used for optimizing the force-measuring device (1); and
b) after a second condition has been determined according to which the condition-related characteristic traits indicate the presence of disturbance factors,
b1) the measuring signal is not used for evaluation by the user; and/or
b2) the measuring signal is not used for optimizing the force-measuring device; and/or
b3) an optimization of the force-measuring device is initiated; and/or
b4) the condition that was determined is signaled to the user or to a connected data-processing unit; and/or
b5) the execution of correction measures is directed accordingly.

4. The method according to claim 1, wherein the first condition-related characteristic traits are determined and processed by evaluating information, wherein said information relates to:
a) manually or automatically set operational parameters, correction parameters, and/or instrument configurations; and/or
b) manually or automatically performed applications; and/or
c) times of operation of the force-measuring device; and/or
d) the temperature of the force-measuring device and/or or the ambient atmosphere; and/or
e) the atmospheric humidity; and/or
f) mechanical influence factors including vibrations or shocks; and/or
g) factors introduced into the force-measuring device including the quality of the line power supply; and/or
h) the weighing load; and/or
i) entries made by the user which describe the condition of the force-measuring device.

5. The method according to claim 1, wherein the second condition-related characteristic traits are determined by also giving consideration to the first condition-related characteristic traits, including an analysis of the at least one uncorrected or only partially corrected signal profile wherein a) the linearity of the at least one signal profile; and/or
b) the change over time of the at least one signal profile with application and/or removal of the load; and/or
c) oscillations within the signal profile are examined and evaluated.

6. The method according to claim 5, wherein disturbances within the signal profile are attributed to a cause, due to an internal or external influence factor including a load change, creep, hysteresis effects, temperature changes or mechanical influences and that a condition is determined which corresponds to said cause.

7. The method according to claim 3, wherein an uncorrected or only partially corrected signal profile that was recorded for the first condition or for another suitable condition of the force-measuring device while carrying out measurements during normal operation of the force-measuring device and/or during test procedures and/or during calibration procedures or a corresponding amplitude profile or corresponding amplitude/time value pairs, while applying the load and while removing the load, is stored in memory with or without information that marks the current time.

8. The method according to claim 7, wherein based on a currently recorded signal profile and/or based on the stored signal profiles for which the first condition or another suitable condition of the force-measuring device was determined, new optimized values for correction parameters based on which a correction of the measurement signal can be performed are determined automatically and stored in the memory storage unit using the processor and the signal-processing unit under the control of a suitable program that is stored in the memory storage unit.

9. The method according to claim 8, wherein a stepwise examination is made of the registered signal profiles starting from the current values for the correction parameters, wherein for each step of the examination a test value is calculated, as a measure for the goodness of the correction that has been achieved, whereupon the values for the correction parameters associated with the best test value, optionally after confirmation by the user, are stored in memory as the new current values.

10. The method according to claim 8, wherein
a) the magnitude of currently occurring changes or oscillations of the signal is determined on the basis of the stored signal profiles and compared to an associated threshold value, whereupon after the threshold value has been found to be exceeded, the method for optimizing the correction parameters is carried out;
b) the method for optimizing the correction parameters is initiated by the user or automatically using a time control function.

11. The method according to claim 7, wherein the signal profiles whose date of storage lies outside a predetermined time frame are deleted from the memory storage unit.

12. A force-measuring device comprising:
a measuring transducer serving to deliver a measuring signal which is representative of a load applied to the force-measuring device; and
a signal-processing unit, said measuring signal being delivered using an analog/digital converter to the signal-processing unit that is supported by at least one processor and at least one memory storage unit and serves to process digital signals, by evaluating pertinent information, a determination of first characteristic traits being made for the condition of the force-measuring device, said first characteristic traits being the result of at least one of internal and external factors affecting the force-measuring device, second characteristic traits for the force-measuring device being determined from the analysis of at least one signal profile of the measuring signal, taking the first characteristic traits into account, the condition of the force-measuring device being determined on the basis of the first and second characteristic traits, whereupon at least one of further processing of the measuring signal and operation of the force-measuring device can be controlled depending on the condition that was determined for the force-measuring device;
wherein the controlling includes determining whether the measuring signal is used in an optimization of the electronic force-measuring device.

13. The force-measuring device according to claim 12, wherein the processor can access correction parameters stored in the memory storage unit, based on which the signal-processing unit can perform a correction of the measuring signal which is changable by internal and/or external influence factors including creep, non-linearity, hysteresis, temperature changes or mechanical influences, and that at time intervals, using the processor and the signal-processing unit and under the control of a program stored in the memory storage unit as well as appropriate correction modules, new optimized values for the correction parameters can be determined automatically and stored in the memory storage unit to replace the previously used values.

14. The force-measuring device according to claim 12, wherein the program is suitable to perform a method for optimization of the behavior of an electronic force-measuring device.

15. The force-measuring device according to claim 12, wherein means are provided which include at least one calibration weight, through which the force-measuring device can be calibrated and through which the condition of the force-measuring device can be determined.

16. The force-measuring device according to claim 12, wherein at least one of the following are provided: means for entering the condition of the force-measuring device or for initiating a method for optimization of the behavior of an electronic force-measuring device, and means through which the user can confirm the acceptance of the optimized values for the correction parameters.

17. The force-measuring device according to claim 13, wherein at least one of the following are provided: means for entering the condition of the force-measuring device or for initiating a method for optimization of the behavior of an electronic force-measuring device, and means through which the user can confirm the acceptance of the optimized values for the correction parameters.

18. The force-measuring device according to claim 14, wherein at least one of the following are provided: means for entering the condition of the force-measuring device or for initiating a method for optimization of the behavior of an electronic force-measuring device, and means through which the user can confirm the acceptance of the optimized values for the correction parameters.

19. The force-measuring device according to claim 15, wherein at least one of the following are provided: means for entering the condition of the force-measuring device or for initiating a method for optimization of the behavior of an electronic force-measuring device, and means through which the user can confirm the acceptance of the optimized values for the correction parameters.

20. The method of claim 1, performed in a measuring balance.

21. The method of claim 4, wherein the information is obtained using sensors.

22. The method of claim 9, wherein the test value is calculated by averaging measuring results.

23. The force-measuring device according to claim 12, wherein the at least one of internal and external factors is transient, and the at least one signal profile of the measuring signal is a long-term time profile of the measuring signal.

24. The method according to claim 1, wherein the at least one of internal and external factors is transient, and the at least one time profile of the measuring signal is a long-term time profile of the measuring signal.

* * * * *